United States Patent Office 3,030,325
Patented Apr. 17, 1962

3,030,325
COATING COMPOSITION COMPRISING AN AQUEOUS EMULSION OF VINYLIDENE CHLORIDE AND AMINE-ALDEHYDE RESIN, METHOD OF COATING POLYSTYRENE THEREWITH, AND ARTICLE THUS COATED
Howard A. Scopp, Suffield, Conn., assignor to Plax Corporation, Bloomfield, Conn., a corporation of Delaware
No Drawing. Filed Dec. 23, 1958, Ser. No. 782,404
19 Claims. (Cl. 260—29.4)

This invention relates to polystyrene and, more particularly, to coating compositions for polystyrene, to methods of applying coating compositions to polystyrene and to coated polystyrene subtrates.

The comparative ease with which polystyrene, both oriented and unoriented, can be polymerized and molded, coupled with its many desirable properties, has commended polystyrene for a great variety of applications. The clarity, sparkle and toughness of oriented polystyrene suits it for utilization in packaging films or sheet as well as in heavy, rigid, structural articles. While oriented polystyrene is a tough polymer, nevertheless, it suffers from surface deterioration, surface fogging, susceptibility to organic solvents, and, further, is permeable to many gases and water vapor. Consequently, to realize fully the potential of polystyrene, it is necessary to apply coatings of other polymeric materials which overcome the deficiences exhibited by polystyrene. Advantageously, the applied coating should be transparent so that the clarity or surface appearance of the polystyrene is unaltered.

Attempts to coat polystyrene have encountered several obstacles. A major obstacle has been the lack of adherence of coating compositions to polystyrene. Coatings tend either to be completely non-adherent or to adhere only spottily to polystyrene. Additionally, polystyrene surfaces are subject to crazing which destroys the appearance of the coated article. Efforts to achieve adherence of a coating while avoiding a crazing of the polystyrene surface also must avoid destroying the transparency of the coating. Further, coating methods must be economical and adapt readily to rapid processing procedures.

Accordingly, it is a primary object of this invention to provide adherent coatings for polystyrene.

It is a further object of this invention to provide adherent coatings for polystyrene which will not effect a crazing of a polystyrene surface.

It is another object of this invention to provide adherent coatings for polystyrene which will improve the abrasion resistance of the polystyrene article.

It is still another object of the invention to provide adherent coatings for polystyrene which will improve the impermeability of the article to gases and water vapor.

It is yet another object of this invention to provide adherent coatings for polystyrene which are substantially transparent and do not hinder the sparkle or clarity of the polystyrene.

It is an additional object of this invention to provide adherent coatings for polystyrene which may be applied in an economical manner.

It is a further object of the present invention to provide a coated polystyrene free from surface fogging.

According to the present invention there is provided a method for coating polystyrene which comprises wetting polystyrene with an aqueous emulsion containing (1) From about 15 to about 40% by weight of a thermoplastic polymeric material containing from about 58 to about 98% by weight based upon polymerized monomers of a material selected from the group consisting of vinylidene chloride, vinyl chloride and vinyl acetate, and mixtures thereof, and from about 2 to about 42% by weight based upon polymerized monomers of a material selected from the group consisting of acrylonitrile and alkyl esters of acrylic and methacrylic acid, and mixtures thereof; said emulsion containing from about .004 to about .046 equivalent of carboxyl groups per 100 parts by weight of the emulsion, said groups being supplied by a carboxylic acid selected from the group consisting of saturated and unsaturated mono and polycarboxylic acids having less than about 8 carbon atoms per molecule; and (2) From about 0.20 to about 4.0% by weight of an intermediate stage, water-soluble, thermosetting amine-aldehyde resin; and heating to dry the coating.

The present invention further contemplates polystyrene surfaces having an adherent coating applied by the above described method.

By the practice of this invention, adherent coatings are obtained which improve abrasion resistance, resistance to fogging, gas and water vapor impermeability, and solvent resistance of polystyrene. The practice of the invention produces films and sheet which are flexible, substantially transparent, and thermoforming.

The present invention, utilizing aqueous emulsions, entirely avoids crazing the polystyrene surface, is economically attractive, and adapts readily to high-speed processing methods. Organic solvent systems generally exhibit a pronounced tendency to craze polystyrene and, consequently, if an organic system is employed to coat polystyrene, a complex solvent is often required. Moreover, in addition to the difficulties which accompany the utilization of volatile and inflammable solvents, solvent recovery systems constitute a major economic burden to high-speed coating processes. These difficulties are avoided entirely by the practice of the present invention.

The thermoplastic polymer latices of the coating compositions of this invention, such as vinylidene chloride copolymers with acrylonitrile, do not adhere readily to polystyrene. Latex polymers applied to polystyrene were found to exhibit very poor adhesion and readily stripped off the substrate. Latex terpolymers of vinylidene chloride with acrylonitrile and an unsaturated acid such as acrylic acid likewise failed to produce a satisfactory bond with polystyrene. Even when steps were taken to insure that the vinylidene chloride latices evenly wet the surface of the polystyrene, the films exhibited inferior adhesion qualities. Only when specific proportions of an intermediate stage, water-soluble, thermosetting amine-aldehyde resin were incorporated into the coating emulsion in the presence of specific proportions of carboxyl groups did the coatings exhibit desirable adhesion properties. Variation of the proportions of amine-aldehyde resin or the carboxyl groups beyond critical limits destroyed the adherence of the coating. By observing the critical proportions as taught by this invention, however, it is possible to obtain coating compositions which adhere firmly to polystyrene, yet maintain transparency and flexibility. Amine-aldehyde resins which may be employed in the coatings of the invention include, without limitation, urea-formaldehyde resin, melamine-formaldehyde resin, and the like.

The thermoplastic polymeric constituent of the coating compositions of this invention contain from about 58 to about 98% by weight based upon polymerized monomers of a material selected from the group consisting of vinylidene chloride, vinyl chloride and vinyl acetate, or mixtures thereof, copolymerized with from about 2% to about 42% by weight based upon polymerized monomers of a material selected from the group consisting of acrylonitrile and alkyl esters of acrylic or methacrylic acid, preferably having less than about 10 carbon atoms in the alkyl group, such as, for example, methyl, ethyl, propyl, butyl, isobutyl, 2-ethyl hexyl and octyl acrylates or methacrylates, or mixtures thereof. The thermoplastic polymeric material also may contain additional polymerizable monomers, such as unsaturated carboxylic acids, but, in any event, the monomers specified above, or mixtures thereof, must be present in amounts within the stated ranges. If desired, the thermoplastic constituent of the coating compositions further may contain any of the plasticizers known to the art. Such plasticizers include, inter alia, dibutyl phthalate, dicapryl phthalate, di-(2-ethyl hexyl) phthalate, methoxy ethyl acetyl ricinoleate, sebacic acid esters, tricresyl phosphate and the like. As employed herein, the term "thermoplastic polymeric material" includes the plasticizer in the event any is present. The plasticizer, however, does not affect the internal proportions specified for the thermoplastic polymer since these proportions are based upon polymerized monomers.

Thermoplastic polymers which contain vinylidene chloride are particularly appropriate for coating polystyrene. Polymers containing vinylidene chloride and acrylonitrile, and particularly those which contain at least about 85% vinylidene chloride, produce most desirable coatings.

Practical coating emulsions have been obtained wherein the thermoplastic polymeric material is present in amounts from about 15 to about 40% by weight of the coating emulsions. Less thermoplastic polymeric material produces emulsions which are too dilute, while an excess of thermoplastic polymeric material produces emulsions which exhibit poor stability. Emulsions containing from about 20 to about 35% thermoplastic polymeric material exhibit optimum properties.

The coating compositions of this invention also contain an intermediate stage water-soluble, thermosetting amine-aldehyde resin in amounts from about 0.20 to about 4.0%, and preferably from about 0.75 to about 2% by weight based on the total weight of the emulsion. Proportions of intermediate stage, water-soluble amine-aldehyde resin which are less than or in excess of the stated limitations fail to yield coatings which exhibit satisfactory adhesion for polystyrene. Amine-aldehyde resins generally are contemplated for utilization in the present invention. They are well known to the art and include, for example, urea-formaldehyde, urea-melamine-formaldehyde, aniline-formaldehyde, thiourea-formaldehyde, biuret-formaldehyde. Comparable resins produced from amines and other aldehydes are also within the contemplation of this invention. Urea-formaldehyde and melamine-formaldehyde resins are readily available and have been utilized to produce excellent coatings.

The third essential of the coating composition of this invention is the presence of carboxyl groups supplied by a carboxylic acid selected from the group consisting of saturated and unsaturated mono- and polycarboxylic acids having less than about 8 carbon atoms per molecule, or mixtures thereof. Acids contemplated for utilization in the present invention include unsaturated acids such as acrylic, maleic, fumaric and itaconic acids, and the like, as well as saturated acids, such as acetic propionic, oxalic, citric, adipic acids, and the like. The acids are employed in sufficient amounts to provide from about .004 to about .046 and preferably from about .007 to about .03 equivalent of carboxyl groups per 100 parts by weight of the coating solution. Unless the ranges of carboxyl content are observed, the coatings do not adhere satisfactorily to polystyrene.

While the acid which supplies the carboxyl groups may be incorporated as a separate constituent of the aqueous coating composition, such acid also may be incorporated as a third component of the thermoplastic polymeric material of the coating. Alternatively, a portion of the carboxylic acid may be present as a constituent of the thermoplastic polymer and additional acid of a like or different kind may be present as a separate constituent of the aqueous emulsion.

Preferred coating compositions comprise an aqueous emulsion containing (1) From about 15 to about 40% of a thermoplastic polymeric material containing from about 58 to about 98% by weight based upon polymerized monomers of vinylidene chloride copolymerized with from about 2 to about 42% by weight based upon polymerized monomers of acrylonitrile and at least about 0.25% of an unsaturated carboxylic acid; and (2) From about 0.20 to about 4.0% by weight of a water-soluble, thermosetting amine-aldehyde resin; said emulsion containing from about .004 to .046 equivalent of carboxyl groups per 100 parts by weight of the emulsion.

Unsaturated carboxylic acids having less than about 8 carbon atoms may be incorporated into the thermoplastic polymeric material in any desired amount in excess of 0.25% of the polymeric material providing, of course, that the requirements relating to the equivalents of carboxyl groups in the final emulsion are observed. The unsaturated acid appropriately is employed in amounts from about 0.25 to about 5% and preferably from about 2 to about 4% of the thermoplastic polymeric material.

Particularly preferred coating emulsions constitute those employing itaconic, acrylic, or methacrylic acid as a component of the thermoplastic polymeric material. Acrylic acid constitutes the most preferred acid component of the polymeric material. When employed in amounts from about .9 to about 5% by weight of the thermoplastic polymer, acrylic acid readily polymerizes with the vinylidene chloride and acrylonitrile to yield stable fluid latices. Although acrylic acid may be employed beyond these limits, the resulting latices tend to be undesirably unstable or too viscous.

When an unsaturated carboxylic acid is polymerized with vinylidene chloride and acrylonitrile to form the thermoplastic polymeric material of the coating composition, the acid not only supplies carboxylic acid groups but, additionally, tends to improve the characteristics of the thermoplastic material. Thus, the acid serves a dual function in the coating composition.

In the formulation of the coating solutions of this invention, thermoplastic polymeric material in the form of a freshly prepared or commercially available latex is most appropriately utilized. Latices may be produced by any of the methods well known to the art. The additional materials of the final coating emulsion, such as water, amine-aldehyde resin, acid and surface active agent may be combined with each other and with the latex in any desired order, but preferably the latex is added to a water solution of the remaining materials.

In order to obtain adherent coatings according to the practice of this invention it is necessary that the polystyrene be wet by the aqueous coating composition. This readily may be accomplished by treating the surface of the polystyrene to render the surface hydrophilic or, alternatively, by incorporating a wetting agent into the aqueous coating solution. Methods of rendering polystyrene hydrophilic have long been known in the prior art, for example, see United States Patent 2,400,720.

Treatments suitable to render polystyrene hydrophilic include, for example, contacting the polystyrene surface with a flame, with ozone, with a sulfuric acid-potassium dichromate solution, with sulfuric acid, or the like. Such treatments render the polystyrene surface hydrophilic yet do not alter the physical appearance of the surface.

An alternative method of accomplishing a wetting of the polystyrene surface contemplates the incorporation of non-ionic or anionic surface active agents such as, for example, sodium lauryl sulfate in amounts of at least 0.25% by weight of the coating composition in excess of any surfactant which may be employed in the emulsion polymerization recipe. While the surface active agent may be employed in any desired amount above the minimum, it has been found that amounts above about 3% by weight of the coating composition tend to induce excessive foaming. While the utilization of a surface active agent in the coating composition eliminates the necessity of treating the polystyrene surface to render it hydrophilic, the coating composition with incorporated surface active agent also may be applied to treated polystyrene surfaces.

The coating may be applied to polystyrene surfaces in accordance with any known coating technique. For example, the coating may be applied by passing the polystyrene article through a bath containing the coating composition, by spraying, by manual brushing, or the like. Such techniques are well known to the art and will not further be described here.

Similarly, any of the drying techniques known to the art may be employed in conjunction with the present invention. The coatings of the present invention may be dried simply by heating the coated polystyrene article. Temperatures of 165° F. have produced non-tacky adherent coatings after drying periods of only one minute. Somewhat longer drying periods extending to ½ or 1 hour also produce excellent coatings. The particular temperature selected for drying the coating will depend in large part upon the demands of the particular process employed. Lower drying temperatures require correspondingly longer drying periods but, in all cases, an adherent coating will result. Coatings will dry to adherent films even if dried at room temperature but the time required for such drying is excessive.

The present invention also embraces articles of manufacture which comprise a polystyrene surface having an adherent coating, the film-forming component of which consists of (1) A thermoplastic polymeric material containing from about 58 to about 98% by weight based upon polymerized thermoplastic monomers of a material selected from the group consisting of vinylidene chloride, vinyl chloride and vinyl acetate, and mixtures thereof, and from about 2 to about 42% by weight based upon polymerized monomers of a material selected from the group consisting of acrylonitrile and alkyl esters of acrylic and methacrylic acid, and mixtures thereof; and (2) From about 0.5 to about 27% by weight based upon the thermoplastic polymeric material of an amine-aldehyde resin.

The preferred articles of manufacture embraced by this invention comprise a polystyrene surface having an adherent coating, the film-forming component of which consists of (1) A thermoplastic polymeric material containing from about 85 to about 96% by weight based upon polymerized thermoplastic monomers of a material selected from about 2 to about 13% by weight based upon polymerized thermoplastic monomers of acrylonitrile and from about 2 to about 42% by weight based upon polymerized thermoplastic monomers of an unsaturated carboxylic acid selected from the group consisting of acrylic, methacrylic and itaconic acids; and (2) From about 2.5 to about 10% by weight based upon the thermoplastic polymeric material of a resin selected from the group consisting of urea-formaldehyde and melamine-formaldehyde.

It will be understood that the present invention embraces articles of manufacture comprising a polystyrene having any of the adherent coatings produced by the previously described coating methods. The composition of the film-forming material of the coating readily can be determined based on the proportions of ingredients in the coating emulsion.

The process of this invention may be employed to produce coated rigid polystyrene articles, coated flexible polystyrene articles such as tubes and containers, coated flexible polystyrene films such as packaging materials, and the like. The articles so produced will exhibit enhanced abrasion resistance, enhanced impermeability to gas and water vapor, enhanced solvent resistance and lower surface static characteristics, and reduced surface fogging. The coatings of the invention may be transparent, or alternatively, the coatings may contain any of the fillers, dyes or pigments known to the art.

While the coating process, the coating composition, and the coated articles of this invention are described with particular reference to polystyrene, it will be understood that the invention is equally applicable to substrates containing at least about 70 percent of a polystyrene such as styrene-acrylonitrile copolymers, methyl styrene-acrylonitrile copolymers, and the like.

The following specific embodiments are included in order more fully to describe the present invention. These embodiments are for purposes of exemplification only and in no way are intended to limit the scope of the invention.

PREPARATION OF POLYMERS

Example I

Terpolymers containing vinylidene chloride, acrylonitrile, and an organic unsaturated acid were prepared according to the following procedure. The amount of organic unsaturated acid indicated in Table I was dissolved in 30 parts by weight of water and the solution was thoroughly blended with an additional 30 parts by weight of water containing 4.9 parts by weight of sodium lauryl sulfate. Subsequently, an ammonium persulfate solution containing 0.48 part of ammonium persulfate and 20 parts of water was blended with the polymerization solution. To the mixture so obtained was added 5.4 parts of acrylonitrile blended with 81.9 parts of vinylidene chloride. Finally, 25 parts of water containing 0.24 part of sodium meta-bisulfite were added to the polymerization solution. The polymerization was conducted in a container maintained in a water bath at a temperature of 34° C. The container was rotated at a speed of 16 r.p.m.

Polymers containing the following specified amounts of unsaturated organic acids exhibited the characteristics shown in Table I. For purposes of comparison, polymer A contained no unsaturated organic acid and was produced from a polymerization mixture containing 7 parts of acrylonitrile and 82 parts of vinylidene chloride.

TABLE I

| Property | A. No Acid | B. Itaconic Acid (1.8 parts) | C. Acrylic (3.6 parts) | D. Maleic (2.0 parts) |
| --- | --- | --- | --- | --- |
| Color | Grey-white. | White. | Grey-white. | Grey-white. |
| Density gms/cm.³ | 1.24 | 1.23 | 1.23 | 1.23. |
| Surface tension dynes/cm. | 60.0 | 54.9 | 48.3 | 59.2. |
| Solids, percent | 47.6 | 44.8 | 46.1 | 43.7. |
| Stability unmodified. | 12 hrs | 16 hrs | 600 hrs | 16 hrs. |
| Reaction time hrs | 2.0 | 4.0 | 4.0 | 3.5. |
| Approximate particle size in microns | 0.1 to 0.01. | >1 | 0.1 to 0.01. | 0.1 to 0.01. |

The above physical measurements were taken with a latex temperature of 26° C.±1° C. The particle size was approximated on the basis of color; densities were determined by means of a hydrometer; surface tensions were determined employing a Du Nouey tensiometer and percent solids were determined employing a weighing technique.

Example II

The procedure of Example I was repeated employing critic and adipic acid. Latices produced in the presence of the specific amounts of acid exhibited the following characteristics:

TABLE II

| Property | E. Citric (0.94 parts) | F. Adipic (1.6 parts) |
| --- | --- | --- |
| Color | Blue-white | Blue-white. |
| Density gms/cm.³ | 1.23 | 1.23. |
| Surface tension dynes/cm | 61.6 | 59.9. |
| Solids, percent | 44.4 | 44.8. |
| Stability unmodified | 20 hrs | 16 hrs. |
| Reaction time hrs | 7.0 | 2.0. |
| Approximate particle size in microns | 1.0 to 0.1 | 1.0 to 0.1. |

*Example III*

Vinylidene chloride, acrylonitrile and acrylic acid were copolymerized employing acrylic acids in concentrations of 0.9%, 1.79%, and 5.18% by weight based on the total weight of the vinylidene chloride-acrylonitrile-acrylic acid terpolymer. The polymer produced employing 0.9% of acrylic acid tended to be unstable, while the polymer produced employing 5.18% acrylic acid tended to produce a very viscous polymer. Optimum characteristics were exhibited by the polymer containing 1.79% acrylic acid.

Based on these tests it appears that terpolymers containing less than about 0.9% acrylic acid tend to be unstable and polymers containing more than 5.18% acrylic acid tend to be too viscous for practical coating purposes.

*Example IV*

A vinylidene chloride-acrylonitrile-itaconic acid terpolymer was prepared from a polymerization solution containing the following constituents:

| | Parts |
| --- | --- |
| Water | 50 |
| Vinylidene chloride | 46 |
| Acrylonitrile | 3 |
| Itaconic acid | 1 |
| Sodium lauryl sulfate | 1 |
| Ammonium persulfate | 0.1 |
| Sodium metabisulfite | 0.1 |

*Example V*

A polymer was prepared by heating to 34° C. a solution containing 207.35 parts of water, 4.5 parts of itaconic acid, 1.2 parts of ammonium persulfate, and 4.9 parts of sodium lauryl sulfate. When the solution reached 34° C., 13.5 parts of acrylonitrile, 204.75 parts of vinylidene chloride, and 0.6 part of sodium metabisulfite in 63.2 parts of water were added. The mixture was refluxed at 34° C.±1° C. for a period of 4–5 hours until refluxing ceased. The procedure produced a solids concentration of from 44 to 50%. The above terpolymer contained vinylidene chloride, acrylonitrile and itaconic acid resulting from the reaction of the monomers in the ratio of 92/6/2.

COATING OF POLYSTYRENE

*Example VI*

A coating solution was prepared employing 35 parts of the latex of Example IV, 25 parts of water and 1 part of a 40% aqueous solution of intermediate stage urea-formaldehyde resin (Uformite 467). The solution was applied to polystyrene which had been treated previously with an acid dichromate solution to render the surface hydrophilic. The coated polystyrene was heated to dry the film. The film was clear and exhibited good adhesion to the polystyrene.

*Example VII*

Fifty-six parts of the emulsion of Example V were blended with 43 parts of water containing 1 part of the aqueous solution of the intermediate stage urea-formaldehyde resin of Example VI. The coating solution, when applied to a polystyrene surface which had previously been treated with acid dichromate to render it hydrophilic, produced a clear coating which adhered well to the polystyrene.

*Example VIII*

Fifty-six parts of the latex emulsions of Example I were blended with 41 parts of water containing 1 part of sodium lauryl sulfate and 2.5 parts of the aqueous solution of urea-formaldehyde resin of Example VI and 1 part of itaconic acid. The coating compositions were applied to untreated polystyrene and the coating subsequently was dried for a half hour at 165° F. The properties of the polystyrene coatings are set forth in Table III.

TABLE III

| Property | A. No Acid | B. Itaconic | C. Acrylic | D. Maleic |
| --- | --- | --- | --- | --- |
| Graininess | none | none | none | none. |
| Clarity | good | good | good | good. |
| Adhesion | poor | fair | do | Do. |
| Abrasion | good | good | do | fair. |

The graininess and clarity were determined by visual observation. The abrasion resistance was determined by the effect of fingernail action on the coated polystyrene as compared to the uncoated polystyrene. The adhesion test consisted of removing three fresh strips of cellulose tape from the coated polystyrene surface.

*Example IX*

The procedure of Example VIII was repeated employing the latex emulsions of Example II. The properties of the coatings are set forth in Table IV.

TABLE IV

| Property | E. Citric Acid | F. Adipic |
| --- | --- | --- |
| Graininess | slight | none. |
| Clarity | good | good. |
| Adhesion | do | Do. |
| Abrasion | do | Do. |

*Example X*

A polymer of vinylidene chloride-acrylonitrile-acrylic acid in proportions of 90/6/4 was prepared according to the method of Example I.

The polymer was blended with the aqueous solution of urea-formaldehyde resin of Example VI, itaconic acid, and sodium lauryl sulfate in proportions shown in Table V. In each instance the film was dried at 165° F. for 30 minutes.

TABLE V

| Latex Terpolymer | Water | Uformite 467 | Itaconic Acid | Sodium Lauryl Sulfate | Film Appearance | Adhesion | Stability, days |
| --- | --- | --- | --- | --- | --- | --- | --- |
| 40 | 60 | 0.62 | 0.5 | 0.5 | clear | good | >28 |
| 56 | 42 | 0.62 | 1.0 | 0.5 | do | do | >28 |
| 56 | 42 | 2.5 | 1.0 | 0.5 | do | do | >28 |

*Example XI*

Fifty-six parts of the terpolymer of Example V were blended with 42 parts of water containing 2.5 parts of the aqueous solution of urea-formaldehyde resin of Example VI and 1 part of sodium lauryl sulfate. The solution was applied to a normal hydrophobic surface and dried. The film so produced was both adherent and clear.

*Example XII*

An emulsion containing 42 parts of water, 56 parts of a 50% solids latex of 85/15 vinylidene chloride-acrylonitrile copolymer containing 20% dibutyl phthalate plasticized (Saran latex F 122–A 20), 2 parts of itaconic acid, and 3 parts of the aqueous solution of urea-formaldehyde resin of Example VI was applied to a polystyrene surface which had been treated with a sulfuric acid-dichromate solution to render it hydrophilic. After 24 hours' aging the film exhibited good adhesion and was substantially clear.

*Example XIII*

A coating emulsion was prepared which contained 39.75 parts of water, 56 parts of a 50% solids latex of 85/15 vinylidene chloride-acrylonitrile plasticized with 20% dibutyl phthalate, 0.25 part of itaconic acid, and 4 parts of the aqueous solution of urea-formaldehyde resin of Example VI. The coating solution was applied to a polystyrene film which had been treated with a sulfuric acid-dichromate solution to render it hydrophilic. After 24-hour aging the film exhibited good adhesion to the polystyrene and was substantially clear.

*Example XIV*

Fifty-six parts of a 50% solids latex of 85/15 vinylidene chloride-acrylonitrile polymer plasticized with 15–20% dibutyl phthalate, were blended with 42 parts of water containing 1 part of itaconic acid and 1 part of the aqueous solution of urea-formaldehyde resin of Example VI. The coating solution was applied to a polystyrene film which had been surface-treated with a sulfuric acid-dichromate solution to render it hydrophilic. The dried film was clear and exhibited good adhesion to the polystyrene.

*Example XV*

A coating solution was prepared containing 56 parts of a 50% solids latex of 85/15 vinylidene chloride-acrylonitrile copolymer containing 20% dibutyl phthalate plasticizer (Saran latex F 122–A 20), 38 parts of water, 2 parts of intermediate stage water-soluble melamine-formaldehyde resin (cymal 401), 2 parts acrylic acid and 2 parts of sodium lauryl sulfate. The solution was coated on polystyrene which previously had been treated to render the surface hydrophilic. The formulation produced a clear, continuous film which exhibited good adhesion to the polystyrene.

*Example XVI*

A coating solution was prepared containing 56 parts of a 50% solids latex of 85/15 vinylidene chloride-acrylonitrile polymer plasticized with 20% dibutyl phthalate (Saran F 122–A 20), 36 parts of water, 3 parts of intermediate stage, water-soluble urea-formaldehyde resin (Urac 180), 0.03 part of a hardener (WF 101), 3 parts of acrylic acid, and 2 parts of sodium lauryl sulfate. The solution was applied to a hydrophilic polystyrene surface and was dried at 165° F. for about 1 hour. The film so produced was continuous and clear, and demonstrated good adhesion with the polystyrene.

*Example XVII*

A coating solution was prepared containing 56 parts of a 50% solids latex of 85/15 vinylidene chloride-acrylonitrile polymer plasticizer with 20% dibutyl phthalate (Saran latex F 122–A 20), 42 parts of water, about 0.2 part of the intermediate urea-formaldehyde resin of Example VI and about 0.5 part of maleic acid. This solution was applied to a hydrophilic polystyrene surface and was dried to produce a clear film that exhibited good adhesion.

*Example XVIII*

A coating formulation was prepared by dissolving 1 part of itaconic acid in 37 parts of water and subsequently adding, in order, 1 part of a 40% solution of water soluble urea-formaldehyde, 5 parts of a 40% solution of sodium lauryl sulfate and 56 parts of a 50% solids latex of 85/15 vinylidene chloride-acrylonitrile polymer containing 20% dibutyl phthalate plasticizer (Saran latex F 122–A 20).

In order to determine minimum curing time the coating was applied to a 2 mil hydrophilic polystyrene film and heated at 160° F. for 1 minute. It was found that the coating demonstrated satisfactory adhesion. It would appear that even shorter curing times may be obtained at higher temperatures.

*Example XIX*

A polystyrene film coated with a vinylidene chloride-acrylonitrile-itaconic acid terpolymer-amine-aldehyde containing emulsion of the invention was tested to determine water vapor transmission.

In order to determine the water vapor transmission, 8 Twing-Albert Vapometer cup assemblies were weighed and half filled with distilled water. Samples, 2½ inch diameter circles, were cut from both coated and uncoated polystyrene. The samples were inserted over the top of the cup and a rubber gasket-ring assembly was fitted tightly to afford a good seal. The test cups were stored upright in an atmosphere maintained at a constant temperature of 73° F. and a constant humidity of 40%. After 24 hours the cup assemblies were weighed. Permeability factors were determined to give values in terms of grams per 100 square inches per 1 mil per 24 hours.

The coated polystyrene samples exhibited an average weight loss of only 0.025 gram per 24 hours. Their permeability factor was 1.33. In contrast, the uncoated polystyrene was characterized by an average weight loss of 0.107 gram per 24 hours and a permeability factor of 4.36.

Since various specific embodiments of the invention other than those specifically disclosed will be apparent to those skilled in the art, it is intended that the invention be limited only to the scope of the appended claims.

I claim:

1. A method for coating polystyrene which comprises applying to a hydrophilic surface of polystyrene an aqueous emulsion containing from about 15 to about 40% by weight of a thermoplastic polymeric material containing from about 58% to about 98% by weight based upon polymerized monomers of a material selected from the group consisting of vinylidene chloride, vinyl chloride and vinyl acetate, and mixtures thereof, and from about 2% to about 42% by weight based upon polymerized monomers of a material selected from the group consisting of acrylonitrile and alkyl esters of acrylic and methacrylic acid, and mixtures thereof, and from about 0.20% to about 4.0% by weight of a water-soluble, thermosetting amine-aldehyde resin, said emulsion containing from about .004 to about .046 equivalent of carboxyl groups per 100 parts by weight of the emulsion, said groups being supplied by a carboxylic acid having less than about 8 carbon atoms per molecule; and heating to dry the coating.

2. The method of claim 1 wherein the thermoplastic polymeric material contains from about 58% to about 98% by weight of vinylidene chloride.

3. The method of claim 1 wherein the emulsion contains an amine-aldehyde resin selected from the group consisting of urea-formaldehyde and melamine-formaldehyde.

4. The method of claim 1 wherein the polystyrene surface is rendered hydrophilic by inclusion in the emulsion at least 0.25% of a surface active agent in excess of that required as an emulsifying agent.

5. The method of claim 1 wherein the thermoplastic material constitutes from about 20% to about 35% by weight of the emulsion.

6. The method of claim 5 wherein the thermoplastic polymeric material contains at least about 85% by weight based upon polymerized monomers of vinylidene chloride and from about 2% to about 15% by weight based upon polymerized monomers of acrylonitrile.

7. The method of claim 6 wherein the emulsion contains from about 0.75% to about 2% by weight of an amine-aldehyde resin selected from the group consisting of urea-formaldehyde and melamine-formaldehyde.

8. The method of claim 7 wherein the emulsion contains from about .007 to about .03 equivalent of carboxyl groups per 100 parts by weight of the emulsion, said groups being supplied by an unsaturated carboxylic acid selected from the group consisting of acrylic, methacrylic and itaconic acids.

9. A coating composition comprising an aqueous emulsion containing from about 15% to about 40% by weight of a thermoplastic polymeric material containing from about 58% to about 98% by weight based upon polymerized monomers of vinylidene chloride copolymerized with from about 2% to about 42% by weight based upon polymerized monomers of acrylonitrile and at least about 0.25% of an unsaturated carboxylic acid and from about 0.25% to about 4.0% by weight of a water-soluble thermosetting amine-aldehyde resin, said emulsion containing from about .004 to .046 equivalent of carboxyl groups per 100 parts by weight of the emulsion.

10. The coating composition of claim 9 wherein the emulsion contains from about 20% to about 35% of the thermoplastic polymeric material.

11. The coating composition of claim 10 wherein the emulsion contains from about .007 to about .03 equivalent of carboxyl groups per 100 parts by weight of the emulsion.

12. The coating composition of claim 11 wherein the emulsion contains from about 0.75% to about 2% by weight of an amine-aldehyde resin selected from the group consisting of urea-formaldehyde and melamine-formaldehyde.

13. The coating composition of claim 12 wherein the thermoplastic polymeric material contains at least about 85% by weight based upon polymerized monomers of vinylidene chloride.

14. The coating composition of claim 12 wherein the unsaturated carboxylic component of the thermoplastic material is selected from the group consisting of acrylic, methacrylic and itaconic acids.

15. An article of manufacture which comprises a polystyrene surface having an adherent coating, the film-forming component of which consists of a thermoplastic polymeric material containing from about 58% to about 98% by weight based upon polymerized thermoplastic monomers of a material selected from the group consisting of vinylidene chloride, vinyl chloride and vinyl acetate, and mixtures thereof and from about 2% to about 42% by weight based upon polymerized monomers of a material selected from the group consisting of acrylonitrile and alkyl esters of acrylic and methacrylic acid and mixtures thereof; and from about 0.5 to about 27% by weight based upon the thermoplastic polymeric material of an amine-aldehyde resin, said coating having been formed by the method of claim 1.

16. An article of manufacture which comprises a hydrophilic polystyrene surface having an adherent coating, the film-forming component of which consists of a thermoplastic polymeric material containing from about 85% to about 96% by weight based upon polymerized thermoplastic monomers of vinylidene chloride, from about 2% to about 13% by weight based upon polymerized thermoplastic monomers of acrylonitrile and from about 2% to about 4% by weight based upon polymerized thermoplastic monomers of an unsaturated carboxylic acid selected from the group consisting of acrylic, methacrylic and itaconic acids; and from about 2.5% to about 10% by weight based upon the thermoplastic polymeric material of a resin selected from the group consisting of urea-formaldehyde and melamine-formaldehyde.

17. The article of claim 16 wherein the unsaturated carboxylic acid component of the thermoplastic material is acrylic acid.

18. The article of claim 17 wherein the coating contains from about 2.5% to about 10% by weight based upon the thermoplastic material of urea-formaldehyde.

19. A method for coating polystyrene which comprises wetting a hydrophilic surface of polystyrene with an aqueous emulsion containing from about 20% to about 35% by weight of a thermoplastic polymeric material containing from about 85% to about 96% by weight based on polymerized monomers of vinylidene chloride, from about 2% to about 13% by weight based on polymerized monomers of acrylonitrile and from about 2% to about 4% by weight based on polymerized monomers of acrylic acid; and from about .75% to about 2% by weight based upon the total weight of the emulsion of urea-formaldehyde, said emulsion containing from about .007 to about .03 equivalent of carboxyl groups per 100 parts by weight of the emulsion; and heating to dry the coating.

References Cited in the file of this patent

UNITED STATES PATENTS

| | | |
|---|---|---|
| 2,536,050 | Fluck | Jan. 2, 1951 |
| 2,589,567 | Nickerson | Mar. 18, 1952 |
| 2,801,936 | Bjorksten et al. | Aug. 6, 1957 |